March 1, 1960  R. LUCIEN  2,926,760
BRAKE DISC ASSEMBLY
Filed May 17, 1956
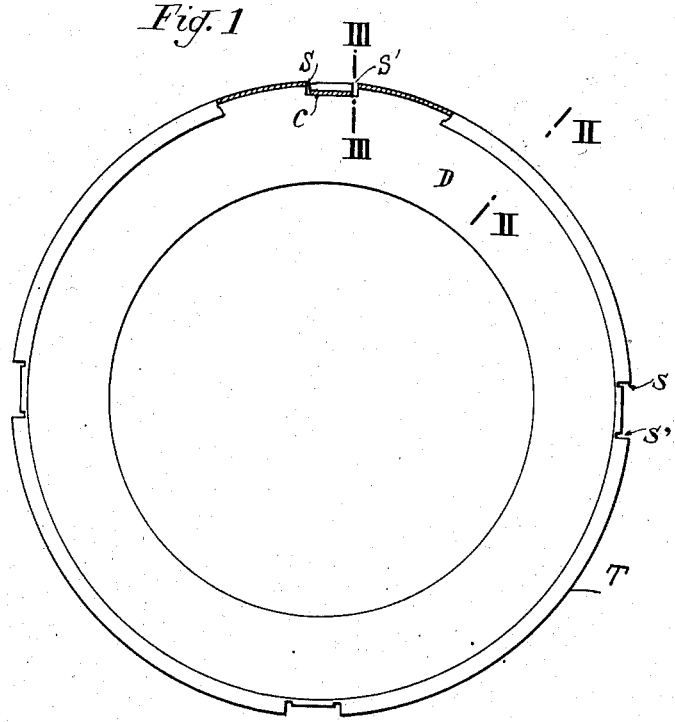
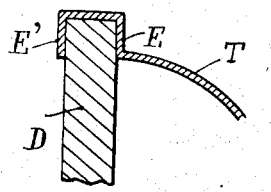
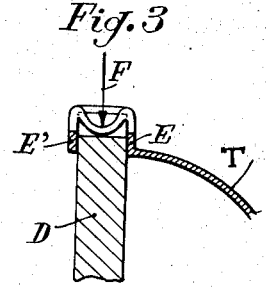

United States Patent Office 2,926,760
Patented Mar. 1, 1960

2,926,760
BRAKE DISC ASSEMBLY

René Lucien, Neuilly-sur-Seine, France, assignor to Société à responsabilité limitée Recherches Etudes Production R.E.P., Paris, France, a corporation of France Application May 17, 1956, Serial No. 585,511

Claims priority, application France January 13, 1956

1 Claim. (Cl. 188—218)

This invention relates to disc brake assemblies.

The invention has as an object the provision of an improved braking system for the wheels of vehicles, and especially of automobile vehicles.

The increase in speeds of automobile vehicles has led to the use of disc brakes of a type similar to those already employed for aircraft.

With this type of brake, brake linings which are movable parallel to the axis of the wheel apply pressure to a disc which is driven in rotation by the wheel. The fixing of the disc to the wheel is effected by means of keys which are generally fixed to the wheel and are engaged in slots of corresponding profile formed on the periphery of the disc.

This arrangement, at least in its application to automobile vehicles, has the drawback that noise is produced by movement of the disc against the keys.

The invention contemplates a silent connection of the disc to the wheel, which none-the-less permits of the expansion of the disc due to the effect of the heat developed by the friction of the brake linings.

The invention is characterized in that the external edge of the disc is inset at the periphery of a circular member co-axial with the wheel and rotating with the wheel, and in that this same external edge is provided with slots accommodating the adjacent parts of the circular member.

The figures of the attached drawings show by way of example and without any implied limitation one embodiment of the invention.

In the drawing:

Fig. 1 is a front view of a disc provided in accordance with the invention, with parts broken away in the vicinity of a slot of the disc.

Fig. 2 is a radial cross-section, on a larger scale, of a disc, taken along the line II—II of Fig. 1.

Fig. 3 is a cross-section, on a larger scale, and taken along the line III—III of Fig. 1.

The disc D is inset in a stamped circular steel disc or rigid body T rigidly fixed to the wheel (not shown) and co-axial therewith. The disc D is held fixed in the axial direction, between two shoulders E—E' of a strip 4 which sandwich the edge of the disc. The shoulder E is punched in the steel sheet T and the shoulder E' is obtained by folding the edge of the sheet over the disc such as, for example, by means of a knurling tool.

The disc is provided at its periphery with a series of notches or slots C having rectilinear sides X parallel to the corresponding diametrical plane of the disc. In the vicinity of these slots, the steel sheet T is formed with peripheral slots S—S' to form strip Y which is punched into these slots, as indicated in Fig. 3 by the arrow F, this rigidly fixing the disc D for rotation with the steel sheet member T for the transmission of the braking torque. Preferably, strips Y have the same width as notches C. By virtue of this invention, shock and the attendant noise are eliminated, while the disc is allowed complete freedom for expansion. Axial and angular displacement of the disc relative to the body T are prevented.

What is claimed is:

An assembly for a disc brake comprising a brake disc and a rigid body peripherally engaging said disc on opposite faces of the latter, said disc defining notches having rectilinear sides each parallel to a diametrical plane of the disc; said body having peripheral slots providing strips of a width equal to the width of said notches, said strip being accommodated in the notches to engage with the sides of the latter whereby axial and angular displacements of the disc with respect to said body are prevented.

References Cited in the file of this patent
UNITED STATES PATENTS

| Number | Name | Date |
|---|---|---|
| 1,775,556 | Hewel | Sept. 9, 1930 |
| 1,947,425 | Rieke | Feb. 13, 1934 |
| 1,982,900 | Buckwalter | Dec. 4, 1934 |
| 1,992,242 | Sargent | Feb. 26, 1935 |
| 2,096,177 | Hunt et al. | Oct. 19, 1937 |
| 2,127,597 | Horn | Aug. 23, 1938 |
| 2,160,598 | Melrath | May 30, 1939 |
| 2,260,149 | Meek | Oct. 21, 1941 |
| 2,317,599 | Freer | Apr. 27, 1943 |
| 2,533,093 | Clark | Dec. 5, 1950 |
| 2,728,421 | Butler | Dec. 27, 1955 |